US007116952B2

(12) United States Patent
Arafa

(10) Patent No.: US 7,116,952 B2
(45) Date of Patent: Oct. 3, 2006

(54) METHOD AND APPARATUS TO PROVIDE AN AREA EFFICIENT ANTENNA DIVERSITY RECEIVER

(75) Inventor: Mohamed Arafa, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 10/682,589

(22) Filed: Oct. 9, 2003

(65) Prior Publication Data

US 2005/0079847 A1 Apr. 14, 2005

(51) Int. Cl.
*H04B 7/08* (2006.01)
(52) U.S. Cl. ................. 455/132; 138/168.1; 138/176.1; 138/188.1; 138/191.1
(58) Field of Classification Search ................. 455/132, 455/133, 168.1, 176.1, 188.1, 191.1, 205, 455/216, 272, 307
See application file for complete search history.

(56) References Cited

U.S. PATENT DOCUMENTS

| | | | |
|---|---|---|---|
| 4,132,952 A | 1/1979 | Hongu et al. | |
| 5,729,829 A | 3/1998 | Talwar et al. | |
| 5,790,587 A | 8/1998 | Smith et al. | |
| 6,466,768 B1 * | 10/2002 | Agahi-Kesheh et al. | 455/78 |
| 6,584,304 B1 * | 6/2003 | Thomsen et al. | 455/188.1 |
| 6,728,517 B1 * | 4/2004 | Sugar et al. | 455/73 |
| 6,751,470 B1 * | 6/2004 | Ella et al. | 455/188.1 |
| 6,901,122 B1 * | 5/2005 | Nadgauda et al. | 375/347 |
| 2002/0173341 A1 * | 11/2002 | Abdelmonem et al. | 455/561 |
| 2003/0100272 A1 * | 5/2003 | Denis et al. | 455/80 |
| 2003/0104797 A1 * | 6/2003 | Webster et al. | 455/296 |
| 2004/0092243 A1 * | 5/2004 | Hey-Shipton | 455/307 |
| 2005/0085260 A1 * | 4/2005 | Ella et al. | 455/552.1 |
| 2005/0227631 A1 * | 10/2005 | Robinett | 455/83 |
| 2005/0245201 A1 * | 11/2005 | Ella et al. | 455/78 |
| 2006/0009177 A1 * | 1/2006 | Persico et al. | 455/143 |

FOREIGN PATENT DOCUMENTS

EP  0966115 A2  12/1999

* cited by examiner

*Primary Examiner*—Nay Maung
*Assistant Examiner*—Richard Chan
(74) *Attorney, Agent, or Firm*—The Law Offices of John C. Scott, LLC

(57) ABSTRACT

A receiver for use in a system implementing antenna diversity uses a switch to allow multiple filters to share a low noise amplifier (LNA).

30 Claims, 2 Drawing Sheets

METHOD AND APPARATUS TO PROVIDE AN AREA EFFICIENT ANTENNA DIVERSITY RECEIVER

FIELD OF THE INVENTION

The invention relates generally to wireless communications and, more particularly, to radio frequency (RF) receivers.

BACKGROUND OF THE INVENTION

Antenna diversity receivers utilize two or more receive antennas to overcome reception problems caused by, for example, multipath fading. Each of the antennas typically requires a dedicated receiver chain to properly process a corresponding receive signal. The outputs of the receiver chains are then processed to generate the overall receiver output. Many modern receiver systems are required to operate within multiple different frequency bands. It may be desired, for example, that a cellular telephone be capable of operating in accordance with multiple different cellular standards that each have a different operational frequency range. Techniques and structures are therefore needed for efficiently implementing antenna diversity receivers, and other types of receivers, that are operative within multiple frequency ranges.

DETAILED DESCRIPTION

Figure 1:
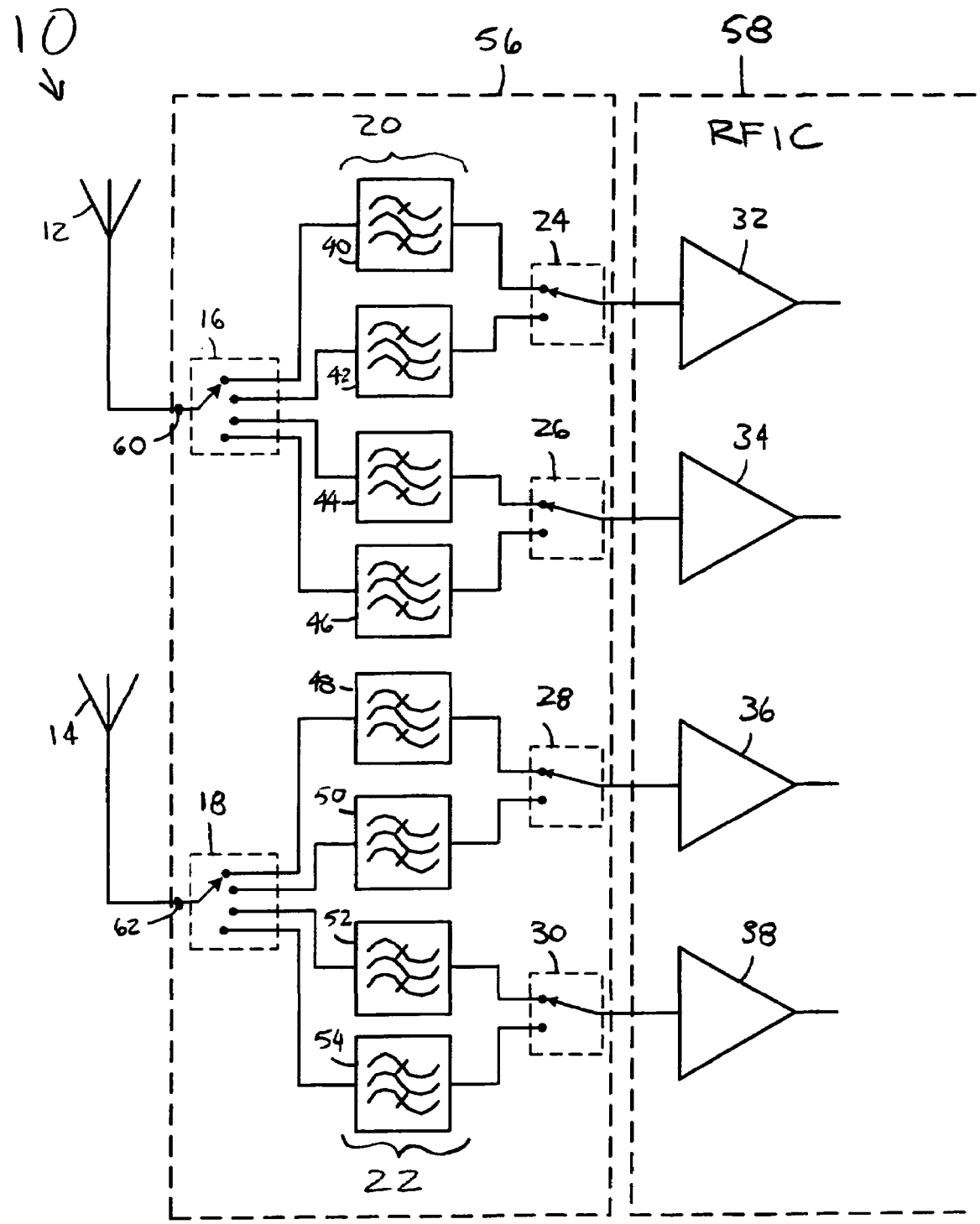
FIG. 1 is a block diagram illustrating an example dual antenna diversity receiver arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example dual antenna diversity receiver arrangement 10 in accordance with an embodiment of the present invention. As illustrated, the receiver arrangement 10 includes: first and second antennas 12, 14; first and second selector switches 16, 18; first and second filter banks 20, 22; first, second, third, and fourth output switches 24, 26, 28, 30; and first, second, third, and fourth low noise amplifiers (LNAs) 32, 34, 36, 38. The first and second filter banks 20, 22 may each include multiple bandpass filters. For example, in the illustrated embodiment, the first filter bank 20 includes a first filter 40, a second filter 42, a third filter 44, and a fourth filter 46 and the second filter bank 22 includes a first filter 48, a second filter 50, a third filter 52, and a fourth filter 54. During normal operation, a signal is received by each of the antennas 12, 14 and the signal is then directed through one of the corresponding filters and one of the corresponding LNAs. The outputs of the LNAs are then processed in a known manner to achieve the overall output of the dual antenna diversity receiver. The first antenna 12 and its corresponding circuitry may represent the primary receive channel of the dual antenna diversity receiver arrangement 10 and the second antenna 14 and its corresponding circuitry may represent the secondary receive channel. Although illustrated as a dual antenna diversity arrangement, it should be appreciated that additional receive channels may also be provided in accordance with the invention.

In at least one embodiment, each filter within a filter bank corresponds to a particular operational frequency band within which the receiver arrangement 10 is to operate. For example, in one possible implementation, the first filter 40, 48 within each filter bank 20, 22 may be operative within the 850 Global System for Mobile Communications (GSM) band (i.e., 869 MHz to 894 MHz), the second filter 42, 50 within the Enhanced Global System for Mobile Communications (EGSM) band (i.e., 925 MHz to 960 MHz), the third filter 44, 52 within the Digital Communication System (DCS) 1800 band (i.e., 1805 MHz to 1880 MHz), and the fourth filter 46, 54 within the Personal Communication System (PCS) 1900 band (i.e., 1930 MHz to 1990 MHz). Many alternative arrangements also exist. The number of filters within each filter bank and the type and number of frequency bands covered may vary from implementation to implementation.

The first and second selector switches 16, 18 are each operative for controllably coupling a corresponding antenna 12, 14 to the input of one of the filters within the corresponding filter bank 20, 22. In at least one embodiment, the first and second selector switches 16, 18 operate in a synchronized fashion so that the first and second antennas 12, 14 are each coupled to filters associated with the same frequency range during receiver operation. For example, if operation within a first frequency band (e.g., the GSM band) is desired, the first selector switch 16 may couple the first antenna 12 to the first filter 40 within the first filter bank 20 while the second selector switch 18 couples the second antenna 14 to the first filter 48 within the second filter bank 22. Similarly, if operation within another frequency band (e.g., the DCS 1800 band) is desired, the first selector switch 16 may couple the first antenna 12 to the third filter 44 within the first filter bank 20 while the second selector switch 18 couples the second antenna 14 to the third filter 52 within the second filter bank 22, and so on. Other control arrangements may alternatively be used. Any type of filters may be used within the filter banks 20, 22 including, for example, surface acoustic wave (SAW) filters, film bulk acoustic resonator (FBAR) filters, microstrip and/or stripline filters (typically at higher frequencies due to size constraints), and others, including combinations of different types of filter.

The LNAs 32, 34, 36, 38 within the receiver arrangement 10 may each be shared by two or more of the filters within the corresponding filter bank 20, 22. For example, in the illustrated embodiment, LNA 32 is shared by filters 40 and 42 within filter bank 20, LNA 34 is shared by filters 44 and 46 within filter bank 20, LNA 36 is shared by filters 48 and 50 within filter bank 22, and LNA 38 is shared by filters 52 and 54 within filter bank 22. Each of the output switches 24, 26, 28, 30 is operative for selectively coupling the output of one of its associated filters to the input of a corresponding LNA. Each LNA will typically be operational within the bandpass frequency ranges of all of its corresponding filters (e.g., LNA 32 should be operational within the bandpass frequency ranges of filter 40 and filter 42, etc.). In at least one embodiment, the output switches 24, 26, 28, 30 operate in synchronism with the selector switches 16, 18. The number of LNAs and the number of output switches associated with each antenna may vary from implementation to implementation. For example, with reference to FIG. 1, the two LNAs 32, 34 associated with antenna 12 may be replaced by a single LNA and the two output switches 24, 26 may be replaced by a single four-to-one output switch. Similar changes may also be made in connection with antenna 14. One or more filters may also be directly connected to the input of a corresponding LNA in accordance with the invention. As will be appreciated, many other modifications may be made to the illustrated structures in accordance with the invention.

By allowing at least one LNA associated with an antenna to be shared by two or more filters, the overall size of the receiver may be reduced considerably. The receiver can thus be implemented within a much smaller area on a semiconductor chip than would be possible if each frequency band had a dedicated LNA for each antenna. The addition of output switches may tend to reduce the sensitivity of an antenna diversity receiver (or, for that matter, a non-antenna diversity receiver). However, the reduction in circuit size that can be achieved by practicing LNA sharing may be considered more desirable than the greater sensitivity that may be available by not practicing it. Typically, the increase in sensitivity achieved by implementing antenna diversity will be significantly larger than the reduction in sensitivity caused by the addition of output switches. Thus, a larger amount of receiver sensitivity improvement may be achieved by switching to antenna diversity and then some of that improvement may be traded off to achieve smaller size by implementing LNA sharing.

With reference to FIG. 1, in at least one embodiment of the present invention, the selector switches, the filters, and the output switches are implemented within a single filter/switch module 56 and the LNAs are implemented as part of a separate radio frequency integrated circuit (RFIC) 58. In addition to the LNAs, the RFIC 58 may also include other receiver circuitry for processing the receive signals. In some other embodiments, the selector switches, the filters, the output switches, and the LNAs are implemented on a single RFIC. Many alternative configurations also exist. In at least one embodiment, the antennas 12, 14 (and the antenna terminals 60, 62) are implemented on the same chip or substrate as the selector switches 16, 18 (e.g., as microstrip patch elements or some other element type). Any form of antenna may be used in accordance with the present invention including, for example, dipoles, patches, helixes, arrays, and/or others. Combinations of different types of antenna elements may also be used.

To achieve a further reduction in receiver size on a semiconductor chip, the secondary receive channel (and any additional receive channels) may utilize lower performance components than the primary receive channel. In addition, a lower performance antenna may also be used for the secondary channel and any additional channels. However, the use of lower performance components in one or more receive channels is not required. In at least one scenario, it may be desired that a dual antenna diversity receiver also be capable of receiving two different channels simultaneously (i.e., one through each antenna). In such a case, it may be desirable to utilize high performance components in all receive channels.

In at least one embodiment of the present invention, a handheld communicator is provided that incorporates features of the present invention. The handheld communicator may include, for example, a cellular telephone or the like. The handheld communicator may be configured for use in accordance with any of a number of different communication standards including, for example, Global System for Mobile Communications (GSM), General Packet Radio Service (GPRS), Enhanced Data for GSM Evolution (EDGE), and/or others.

Figure 2:
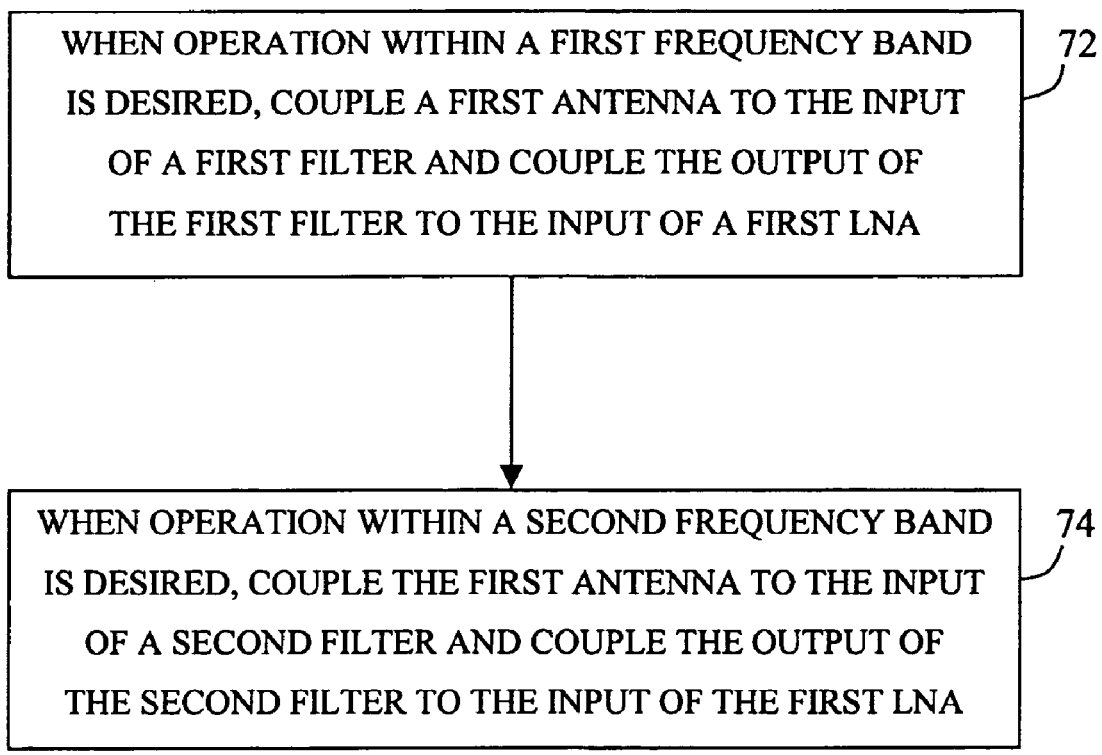
FIG. 2 is a flowchart illustrating an example method for use in an antenna diversity receiver system in accordance with an embodiment of the present invention.

FIG. 2 is a flowchart illustrating an example method 70 for use in an antenna diversity receiver system in accordance with an embodiment of the present invention. The antenna diversity receiver system will have at least first and second antennas and each antenna will have at least two corresponding bandpass filters. When receiver operation within a first frequency band is desired, the first antenna is coupled to the input of a first bandpass filter and the output of the first bandpass filter is coupled to the input of a first LNA (block 72). This coupling may be performed by, for example, sending a control signal to an appropriate switch. When receiver operation within a second frequency band is desired, the first antenna is coupled to the input of a second bandpass filter and the output of the second bandpass filter is coupled to the input of the first LNA (block 74). In this manner, the first and second bandpass filter (and possibly other bandpass filters) may share the first LNA. A similar procedure may be followed with respect to the other antenna(s) within the system. The above described method may be expanded for use in receivers supporting any number of different frequency bands. For example, in a receiver that is operative within four frequency bands, when operation within a third frequency band is desired, the first antenna may be coupled to the input of a third bandpass filter and the output of the third bandpass filter may be coupled to the input of a second LNA (or, in another embodiment, to the input of the first LNA). Similarly, if operation within the fourth frequency band is desired, the first antenna may be coupled to the input of a fourth bandpass filter and the output of the fourth bandpass filter may be coupled to the input of the second LNA (or, in another embodiment, to the input of the first LNA). Again, a similar procedure may be followed with respect to the other antenna(s) within the system.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An antenna diversity receiver comprising:
   an antenna terminal;
   a first filter;
   a second filter;
   a third filter;
   a selector switch having a first switch position to couple said antenna terminal to an input of said first filter, a second switch position to couple said antenna terminal to an input of said second filter, and a third switch position to couple said antenna terminal to an input of said third filter;
   a first low noise amplifier (LNA);
   a second LNA;

a first output switch having a first switch position to couple an output of said first filter to an input of said first LNA and a second switch position to couple an output of said second filter to said input of said first LNA; and a second output switch having a first switch position to couple an output of said third filter to an input of said second LNA.

2. The receiver of claim 1, wherein:

said first filter has a first bandpass frequency range, said second filter has a second bandpass frequency range that is different from said first bandpass frequency range, and said first LNA is operable within both said first and said second bandpass frequency ranges; and said third filter has a third bandpass frequency range that is different from said first and second bandpass frequency ranges, and said second LNA is operable within said third bandpass frequency range.

3. The receiver of claim 1, further comprising:

a fourth filter that is different from said first, second, and third filters, wherein said second output switch includes a second switch position to couple an output of said fourth filter to an input of said second LNA.

4. The receiver of claim 1, further comprising:

a receive antenna connected to said antenna terminal.

5. The receiver of claim 1, wherein:

said selector switch, said first, second, and third filters, and said first and second output switches are located within a common module and said first and second LNAs are implemented on a separate semiconductor chip that is coupled to said module.

6. The receiver of claim 1, wherein:

said selector switch, said first, second, and third filters, said first and second output switches, and said first and second LNAs are implemented on a common semiconductor chip.

7. The receiver of claim 3, wherein:

said antenna terminal is a first antenna terminal and said selector switch is a first selector switch; and said receiver further includes:
   a second antenna terminal;
   fifth, sixth, seventh, and eighth filters;
   a second selector switch having a first switch position to couple said second antenna terminal to an input of said fifth filter, a second switch position to couple said second antenna terminal to an input of said sixth filter, a third switch position to couple said second antenna terminal to an input of said seventh filter, and a fourth switch position to couple said second antenna terminal to an input of said eighth filter;
   a third LNA;
   a fourth LNA;
   a third output switch having a first switch position to couple an output of said fifth filter to an input of said third LNA and a second switch position to couple an output of said sixth filter to said input of said third LNA; and
   a fourth output switch having a first switch position to couple an output of said seventh filter to an input of said fourth LNA and a second switch position to couple an output of said eighth filter to an input of said fourth LNA.

8. The receiver of claim 7, wherein:

said first filter and said fifth filter have a first bandpass frequency range, said second filter and said sixth filter have a second bandpass frequency range, said third filter and said seventh filter have a third bandpass freciuency range, and said fourth filter and said eighth filter have a fourth bandpass frequency range, wherein said first, second, third, and fourth bandpass frequency ranges are different from one another.

9. The receiver of claim 1, further comprising:

at least one additional filter, wherein said first output switch includes at least one additional position to couple an output of said at least one additional filter to an input of said first LNA.

10. The receiver of claim 1, wherein:

said first filter includes a surface acoustic wave (SAW) filter.

11. The receiver of claim 1, wherein:

said first filter includes a film bulk acoustic resonator (FBAR) filter.

12. The receiver of claim 1, wherein:

said receiver is a dual antenna diversity receiver.

13. A receiver comprising:

a first antenna terminal;

a first plurality of filters;

a first selector switch to controllably couple said first antenna terminal to an input of a selected one of the filters in said first plurality of filters;

at least one first low noise amplifier (LNA);

at least one first output switch to controllably couple an output of said selected one of said filters in said first plurality of filters to an input of a corresponding first LNA;

a second antenna terminal;

a second plurality of filters;

a second selector switch to controllably couple said second antenna terminal to an input of a selected one of the filters in said second plurality of filters;

at least one second LNA; and at least one second output switch to controllably couple an output of said selected one of said filters in said second plurality of filters to an input of a corresponding second LNA;

wherein said first and second antenna terminals, said first and second pluralities of filters, said first and second selector switches, said at least one first output switch, and said at least one second output switch are located within a common module and said at least one first LNA and said at least one second LNA are located on a separate semiconductor chip that is coupled to said module.

14. The receiver of claim 13, wherein:

said first plurality of filters and said second plurality of filters include an equal number of filters.

15. The receiver of claim 13, wherein:

said common module includes a semiconductor chip that carries at least said first and second selector switches.

16. The receiver of claim 15, wherein:

said semiconductor chip of said common module includes first and second antenna elements on a surface thereof that are coupled to said first and second selector switches, respectively.

17. The receiver of claim 13, further comprising:

at least one other antenna terminal and at least one other selector switch.

18. A module for use within an antenna diversity receiver system, comprising:

a first antenna terminal;

a first plurality of filters, said first plurality of filters including at least a first filter, second filter, a third filter, and a fourth filter;

a first selector switch to controllably couple said first antenna terminal to an input of a selected one of the filters in said first plurality of filters;

a first output terminal for connection to a first external low noise amplifier (LNA);

a second output terminal for connection to a second external LNA;

a first output switch having a first switch position to couple an output of said first filter to said first output terminal and a second switch position to couple an output of said second filter to said first output terminal; and a second output switch having a first switch position to couple an output of said third filter to said second output terminal and a second switch position to couple an output of said fourth filter to said second output terminal.

19. The module of claim 18, wherein:
said first plurality of filters includes at least one additional filter that is coupled to said first output switch.

20. The module of claim 18, further comprising:
a second antenna terminal;
a second plurality of filters; and
a second selector switch to controllably couple said second antenna terminal to an input of a selected one of the filters in said second plurality of filters.

21. The module of claim 20, wherein:
said module is for use within a dual antenna diversity receiver system.

22. A system comprising:
a first patch antenna;
a second patch antenna; and
a receiver comprising:
   a first antenna terminal coupled to said first patch antenna;
   a first plurality of filters;
   a first selector switch to controllably couple said first antenna terminal to an input of a selected one of the filters in said first plurality of filters;
   at least one first low noise amplifier (LNA);
   at least one first output switch to controllably couple an output of said selected one of said filters in said first plurality of filters to an input of a corresponding first LNA;
   a second antenna terminal coupled to said second patch antenna;
   a second plurality of filters;
   a second selector switch to controllably couple said second antenna terminal to an input of a selected one of the filters in said second plurality of filters;
   at least one second LNA; and
   at least one second output switch to controllably couple an output of said selected one of said filters in said second plurality of filters to an input of a corresponding second LNA;
   wherein said at least one first LNA includes two or more LNAs and said at least one first output switch includes two or more output switches.

23. The system of claim 22, wherein:
said first and second patch antennas and said first and second selector switches are implemented on a common substrate.

24. The system of claim 22, wherein:
wherein said first and second antenna terminals, said first and second pluralities of filters, said first and second selector switches, said at least one first output switch, and said at least one second output switch are located within a common module and said at least one first LNA and said at least one second LNA are located on a separate semiconductor chip that is coupled to said module.

25. The system of claim 22, wherein:
said system is a handheld communicator.

26. A method for use in an antenna diversity receiver comprising:
when operation within a first frequency band is desired:
   coupling a first antenna to an input of a first filter associated with said first antenna; and
   coupling an output of said first filter associated with said first antenna to an input of a first low noise amplifier (LNA) associated with said first antenna;
when operation within a second frequency band is desired:
   coupling said first antenna to an input of a second filter associated with said first antenna; and
   coupling an output of said second filter associated with said first antenna to said input of said first LNA associated with said first antenna; and when operation within a third frequency band is desired:
   coupling said first antenna to an input of a third filter associated with said first antenna; and
   coupling an output of said third filter associated with said first antenna to an input of a second LNA associated with said first antenna.

27. The method of claim 26, further comprising:
when operation within said first frequency band is desired:
   coupling a second antenna to an input of a first filter associated with said second antenna; and
   coupling an output of said first filter associated with said second antenna to an input of a first LNA associated with said second antenna; and when operation within said second frequency band is desired:
   coupling said second antenna to an input of a second filter associated with said second antenna; and
   coupling an output of said second filter to said input of said first LNA associated with said second antenna.

28. The method of claim 26, wherein:
coupling an output of said first filter associated with said first antenna to an input of a first LNA associated with said first antenna includes sending a control signal to a switch.

29. The method of claim 27, further comprising:
when operation within said third frequency band is desired:
   coupling said second antenna to an input of a third filter associated with said second antenna; and
   coupling an output of said third filter associated with said second antenna to an input of a second LNA associated with said second antenna.

30. The method of claim 29, further comprising:
when operation within a fourth freciuency band is desired:
   coupling said first antenna to an input of a fourth filter associated with said first antenna;
   coupling an output of said fourth filter associated with said first antenna to an input of said second LNA associated with said first antenna;
   coupling said second antenna to an input of a fourth filter associated with said second antenna; and
   coupling an output of said fourth filter associated with said second antenna to an input of said second LNA associated with said second antenna.

* * * * *